United States Patent [19]
Akulov

[11] 3,740,998
[45] June 26, 1973

[54] METHOD FOR CALIBRATING INSTRUMENTS DESIGNED TO GAUGE THE THICKNESS OF NON-MAGNETIC COATINGS ON METAL PRODUCTS AND ATTACHMENT FOR THE REALIZATION OF THIS METHOD

[76] Inventor: Nikolai Sergeevich Akulov, Leninsky prospekt 70, Minsk, U.S.S.R.

[22] Filed: Nov. 17, 1970

[21] Appl. No.: 90,269

[52] U.S. Cl. .................................. 73/1 A, 324/74
[51] Int. Cl. ............................................ G01b 7/06
[58] Field of Search .................. 73/1 A; 324/34 TK, 324/74

[56] References Cited
UNITED STATES PATENTS

| | | | |
|---|---|---|---|
| 2,749,505 | 6/1956 | McNary | 73/1 R |
| 2,503,720 | 4/1950 | Gieseke | 324/34 TK |
| 3,521,160 | 7/1970 | Nix | 324/34 TK |

Primary Examiner—S. Clement Swisher
Attorney—Waters, Roditi, Schwartz & Nissen

[57] ABSTRACT

The present invention relates to a method for calibrating instruments designed to gauge the thickness of non-magnetic coatings on ferromagnetic products and an attachment to realize this method.

The method and the attachment according to the invention are characterized by the fact that a gauge is calibrated by forming air gaps between an electro-magnet of the gauge being calibrated and an uncoated area of the ferromagnetic product being gauged, imitating the thickness of non-magnetic coatings, readings of the gauge are noted for each setting of the air gap, and the readings are then plotted as a calibration chart of the thickness gauge for a given type of substrate.

The method enables thickness gauges to be calibrated without the use of expensive standards.

2 Claims, 1 Drawing Figure

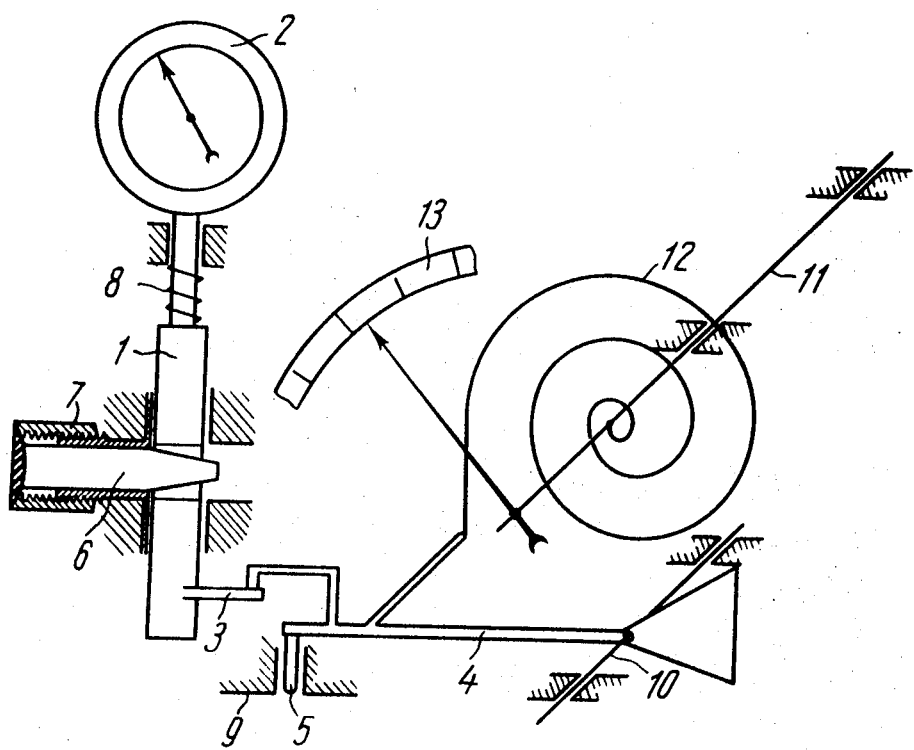

METHOD FOR CALIBRATING INSTRUMENTS DESIGNED TO GAUGE THE THICKNESS OF NON-MAGNETIC COATINGS ON METAL PRODUCTS AND ATTACHMENT FOR THE REALIZATION OF THIS METHOD

The present invention relates to instruments designed to gauge the thickness of non-magnetic coatings on ferromagnetic products, and more specifically to a method for calibrating such instruments and an attachment to realize this method.

The invention may be utilized to gauge the deposits applied by electroplating, metal spraying and paintwork.

All existing instruments designed to gauge the thickness of non-magnetic coatings on ferromagnetic products, based on magnetic or electro-magnetic principles, are calibrated with the aid of high-precision standards which take much labor and money to make and which cannot practically be made with sufficient accuracy in some cases, such as for very thin coatings, Besides, instruments calibrated against standards are subject to errors when they are used to gauge coatings on ferromagnetic products differing in chemical analysis, heat treatment and configuration owing to the disturbing factors listed above.

The main object of the present invention is to provide a method for calibrating instruments designed to gauge the thickness of non-magnetic coatings on a ferromagnetic substrate and an attachment for such instruments, which enables these instruments to be calibrated without the use of standards, directly on ferromagnetic products of specific shape, fabricated of any type of steel possessing remanent ferromagnetism.

This object is attained by a method for the calibration of thickness gauge by which, according to the invention, fixed air gaps are consecutively formed between the electro-magnet of a gauge and an uncoated area on the ferromagnetic product under test, imitating the thickness of a non-magnetic coating, readings of the gauge are noted for each setting of the air-gap, and the readings are plotted as a calibration chart of the thickness gauge for a given ferromagnetic substrate.

An attachment intended to realize the method disclosed herein incorporates, according to the invention, a means capable of being moved axially with the aid of an adjusting element in order to set a desired air gap between the electro-magnet of the thickness gauge and the surface of the ferromagnetic product under test, made in the form of a spindle one end of which is coupled to a dial indicator measuring the axial travel of the spindle, while the other end interacts during calibration with the electro-magnet of the gauge being calibrated in such a way that when the spindle goes up the electro-magnet also goes up, forming an air gap between the electro-magnet and the surface of the ferromagnetic product being gauged.

The present invention offers a number of advantages over the existing method for calibrating gauges of non-magnetic coatings, as follows:

there is no need to use standards for calibration, owing to which the overall cost of the gauges is materially cut down;

the field of application of these gauges is considerably extended, because, in accordance with the calibration method disclosed herein, the thickness of non-magnetic coatings may be gauged directly on products made from any type of steel possessing a remanent ferromagnetism and having any configuration, while the error of measurements lies practically within the limits of accuracy of the gauges themselves.

The invention will be more fully understood from the following description of a preferred embodiment of a method for calibrating instruments designed to gauge the thickness of non-magnetic coatings on ferromagnetic products and an attachment to realize this method, when read in connection with the accompanying drawing which shows the kinematics of an attachment for gauge calibration embodied in accordance with the present invention.

As an example, consider an attachment for gauge calibration with special reference to the Akulov magnetic thickness gauge based on measuring the force that is required to pull a permanent magnet away from the product being gauged.

In the drawing, the single FIGURE illustrates an attachment for calibrating instruments for gauging the thickness of non-metallic coatings on metal products.

Referring to the drawing, the attachment comprises a spindle 1 one end of which is coupled to a dial indicator 2 and the other end is connected via a bearing flat 3 to the balancing lever 4 of the gauge to which is attached an electro-magnet 5 of this gauge. The spindle 1 has a hole receiving a cone 6 coupled to a micrometer screw 7 which serves as the adjusting element of the attachment.

The spindle 1 carries a spring 8 which holds the spindle tightly against the cone 6.

Calibration of the gauge is effected as follows.

The gauge and the attachment together are set up with their bearing surface 9 on an uncoated area of the ferromagnetic product being gauged.

To set an air gap between the electro-magnet 5 and the bearing surface 9 of the gauge such that will imitate the thickness of the coating, the micrometer screw 7 is rotated to move the spindle 1 axially upwards while noting the travel of the spindle on the dial indicator 2, so that the lower end of the spindle 1, acting through the bearing flat 3, lifts the electro-magnet 5.

The lift of the electro-magnet 5 is practically equal to the travel of the spindle 1 owing to the large distance between the pivot 10 of the lever 4 and the end of the electro-magnet 5 and also owing to the small angles of rotation involved.

With the air gap thus set and measured by the indicator 2, the force with which the electro-magnet micrometer 5 is attracted to the surface of the ferromagnetic product is measured. As the main pivot 11 of the gauge is rotated (which is done in this instrument automatically), a spiral spring 12 is twisted until the torque due to the spring 12 produces a force sufficient to break the electro-magnet 5 away from the surface of the product under test, and the magnitude of the force is read off the scale 13 of the instrument.

Now the mocrometer 7 is rotated to set another specified air gap between the electro-magnet 5 and the bearing surface 9 of the instrument, and the reading of the instrument is noted for this air gap. This operation is repeated many times.

The readings thus obtained are plotted as a calibration chart in which readings of the instrument are laid off as, for example, ordinate and the respective air gaps as abscissa. After that, the attachment is disconnected from the instrument by unscrewing the micrometer screw 7, thereby interrupting mechanical linkage between the electro-magnet 5 and the spindle 1.

The gauge thus calibrated is ready for gauging the thickness of any non-magnetic coatings on a given range of ferromagnetic products.

What is claimed is:

1. A method for calibrating instruments designed to gauge the thickness of non-magnetic coatings on ferromagnetic products, consisting in that an electro-magnet of a gauge is set up on an uncoated area of the product being gauged, air gaps are consecutively formed between their mating surfaces to imitate the thickness of non-magnetic coatings, readings of the gauge are noted for each setting of the air gap, and the readings are then plotted as a calibration chart of the thickness gauge for a given substrate of the product.

2. An adjusting element adapted to lift the end of a lever carrying a ponderomotive permanent magnet over the surface of a ferromagnetic product being gauged, said adjusting element being coupled to an indicator serving to register the value of an air gap formed between said ponderomotive permanent magnet and the surface of the product being gauged.

* * * * *